United States Patent [19]

McGuire et al.

[11] Patent Number: 5,176,400
[45] Date of Patent: Jan. 5, 1993

[54] AIR BAG MOUNTING SYSTEM

[75] Inventors: James T. McGuire, Byron; Michael D. Marvell, Rockford, both of Ill.; Stephen J. Dixon, Royal Oak, Mich.

[73] Assignee: Textron Inc., Providence, R.I.

[21] Appl. No.: 727,649

[22] Filed: Jul. 9, 1991

[51] Int. Cl.⁵ ............................................. B60R 21/16
[52] U.S. Cl. .................................. 280/728; 280/731; 280/732; 280/743
[58] Field of Search ................ 280/728, 731, 732, 743

[56] References Cited

U.S. PATENT DOCUMENTS

| | | | |
|---|---|---|---|
| 3,843,152 | 10/1974 | Nonaka | 280/731 |
| 3,910,597 | 10/1975 | Seko | 280/731 |
| 4,183,550 | 1/1980 | Sudou | 280/731 |
| 5,002,306 | 3/1991 | Hiramitsu et al. | 280/731 |
| 5,064,218 | 11/1991 | Hartmeyer | 280/731 |

Primary Examiner—Kenneth R. Rice
Attorney, Agent, or Firm—Trexler, Bushnell, Giangiorgi & Blackstone, Ltd.

[57] ABSTRACT

An air bag mountng system for assembling an air bag having a mounting flange with an air bag inflator and for thereafter assembling the assembled air bag and inflator with a preselected surface of an automotive vehicle comprises a module housing, and a retaining ring. The mounting flange is disposed between the retaining ring, and the module housing. The module housing has apertures therein capable of accepting projecting pins disposed about the retaining ring. The projecting pins are forced into the apertures forming a frictioned interference fit capable of holding the air bag subassembly together during manufacture of the subassembly and installation in a vehicle. Preferably, the projecting pins are hexlobular in nature.

19 Claims, 3 Drawing Sheets

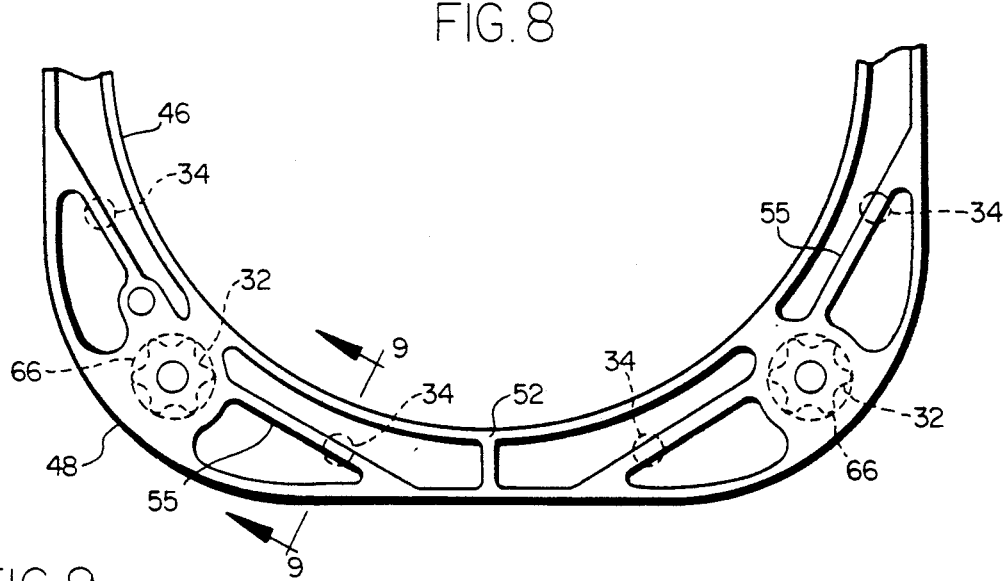
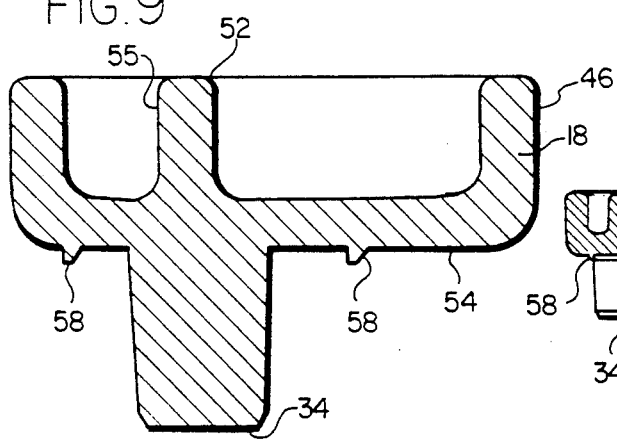
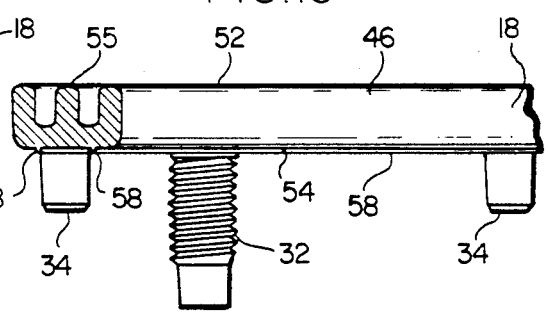
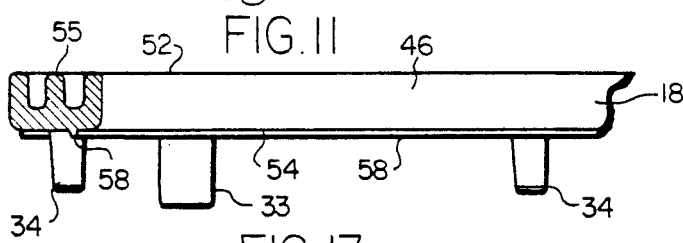
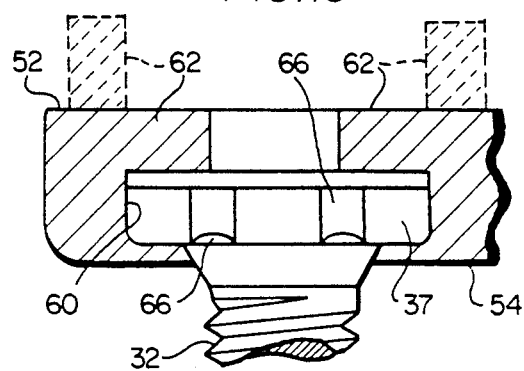
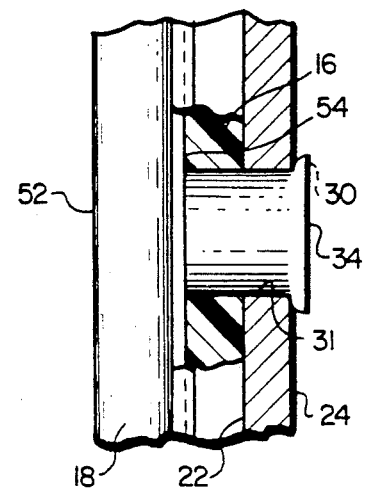

AIR BAG MOUNTING SYSTEM

BACKGROUND AND SUMMARY OF THE INVENTION

The present invention relates generally to a novel and improved air bag mounting system. More specifically, the invention concerns an arrangement for retaining a preassembled state among several elements of an air bag assembly useful for maintaining the integrity of the subassembly, thus defined, during the final assembly operations required for manufacture and installation of the air bag in an automobile.

Given the present, high demand for air bags in cars, the utility of the invention will become clear upon reading the following description.

An air bag subassembly generally consists of four elements: a housing, an air bag, a retaining ring, and an inflator. Given the compartmentalized, assembly line manufacturing procedure inherent in automobile factories today, the first three of these elements, usually, are pre-assembled at one area of the factory, and transported, in pre-assembled form (i.e. as a subassembly), to another part of the factory for final assembly with the inflator and installation in an automobile. In some instances, the four air bag elements are assembled by an air bag manufacturer, and sold, as a unit in their assembled form, to an automobile manufacturer. Both of these manufacturing procedures require some handling and transportation of the first three above-mentioned elements of the air bag subassembly in their pre-assembled form.

Because of this handling and transportation, it is necessary that the three elements of the air bag subassembly be joined firmly together, so that they will not become dislodged before final assembly with the inflator, prior to installation in an automobile. In the past, the retaining ring was pre-assembled with individual, rivets independent to the retaining ring which were "peened over" (Put simply, expanding and flattening portions of the rivets adjacent to the retaining ring) to hold the retaining ring in assembly with the housing, with the air bag sandwiched in between, so as to insure a solid combination. This method, however, has certain drawbacks.

The riveting process employed individual, independent rivets, and was another step in the manufacturing process, which served to delay production by increasing the time needed to produce an air bag subassembly. Workmen sometimes spend an inordinate amount of time trying to line up corresponding holes and inserting rivets therein.

Additionally, when a workman tried to insert a rivet, another, previously inserted rivet sometimes fell out, necessitating repetition of steps already taken, further increasing the time taken in pre-assembly. The riveting also added to the production costs of the air bag, as the individual rivets had to be first positioned properly and then peened over to effect pre-assembly.

Furthermore, when the retaining ring was riveted to the housing, there was some danger of damaging the air bag during the handling and riveting operations, thereby compromising the structural integrity of the air bag. If the structural integrity of the air bag is compromised, the entire assembly must be discarded, adding further production costs.

Air bag inflation takes place in a time period on the order of one-twentieth of a second. Accordingly, forces of great magnitude are generated during the inflation process. Therefore, it is important that the retaining ring be able to firmly hold the air bag in place so as to prevent blow-by of the inflating material. Also, due to the great forces present during inflation, it is important that the air bag assembly be reinforced to prevent deformation of the retaining ring.

Accordingly, some alternative means is desired that is capable of effectively joining the first three elements of an air bag assembly into a subassembly, before final assembly with the inflator, and subsequent installation of that subassembly in an automobile, or other vehicle, so that the elements of the assembly will not become dislodged during handling and transportation. Preferably, such means should be low in cost, and be relatively simple, taking little time to employ. Most importantly, the means, or its employment cannot compromise the structural integrity of the air bag in any way. Additionally, the alternative means would have means for preventing blow-by of inflation material, and provide reinforcing means for the retaining ring.

OBJECTS AND SUMMARY OF THE INVENTION

A general object of the invention is to provide an arrangement for retaining a preassembled state among several elements of an air bag subassembly.

Another object of the present invention is to provide projecting pins which are integral with the retaining ring which fit into apertures in the module housing.

An additional object of the invention is to provide projecting pins which can be peened over once inserted into apertures in the module housing thereby assuring a tight fit among the elements of the subassembly.

A further object of the present invention is to provide large projecting pins, instead of threaded studs, integral with the retaining ring useful for mounting an inflator to the module housing.

A more specific object of the invention is to provide an air bag subassembly having a snap-type interference fit between certain of the elements thereof, which can maintain these elements in a pre-assembled disposition pending and during the final assembly.

Another object of the invention is to provide a means for holding the elements of an air bag subassembly together in accordance with the foregoing objects that is less time consuming, less expensive, and more reliable than the means currently available.

A further object of the invention to to provide a means for holding the elements of an air bag subassembly together in accordance with the foregoing objects that will lessen the chances of compromising the structural integrity of the air bag.

A related object of the present invention is to provide a means for holding the elements of an air bag subassembly together in accordance with the foregoing objects having means for preventing blow-by of inflating media during the inflation process.

Another object of the invention is to provide an air bag assembly having a retaining ring having means for reinforcing the retaining ring so as to prevent deformation of the retaining ring.

An air bag mounting system for assembling an air bag having a mounting flange with an air bag inflator and for thereafter assembling the assembled air bag and inflator with a preselected surface of an automotive vehicle, constructed in accordance with the present invention, is comprised of a retaining ring, and a module housing. The module housing has a plurality of through apertures. The air bag mounting flange is disposed between the module housing, and the retaining ring. Means for providing a snug fit between the retaining ring and the module housing are disposed about either the retaining ring, or the housing for holding the subassembly in a pre-assembled condition, ready for further assembly with the inflator.

In some constructions, the means for providing a snug fit between the housing and the retaining ring comprises projecting pins having a cylindrical, or alternatively, a multilobular surface, and apertures of sufficient size to accept those projecting pins. With some pins, a snug, interference fit is formed between the pins and inner wall surfaces of the apertures. Some of the projecting pins are constructed so as to be peened over to further strengthen the snug fit. Additionally, means for preventing blow-by of inflation medium and retaining ring reinforcing means are disposed about at least one side of the retaining ring. In some additional constructions, large cylindrical projecting pins are disposed on the retaining ring useful for mounting an inflator.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements, and in which:

FIG. 8 is a partial sectional view, similar to that of FIG. 3, showing another embodiment of the invention wherein reinforcing means are disposed on the first side of the retaining ring proximate to the projecting pins;

FIG. 9 is an enlarged sectional view, taken along line 9—9 of FIG. 8, showing the particular disposition of the reinforcing means with respect to the projecting pins;

FIG. 10 is a partial sectional view, similar to that of FIG. 7, showing a further embodiment of the invention wherein large, substantially cylindrical projecting pins replace the multilobular projecting pins shown in the other Figures;

FIG. 11 is a partial sectional view, similar to that of FIG. 10, showing a still further embodiment of the invention wherein the threaded inflator mounting studs are replaced by large, substantially cylindrical inflator mounting projections;

FIG. 12 is a partial sectional view, similar to that of FIG. 5, of the embodiment of FIG. 10, showing an end of the cylindrical projecting pin peened over to strengthen the fit between the module housing and the retaining ring; and FIG. 13 is an enlarged partial sectional view, similar to that of FIG. 6, showing an alternative embodiment of the invention employing multilobular recesses to retain the inflator mounting studs.

DETAILED DESCRIPTION OF A PREFERRED EMBODIMENT

Figure 1:
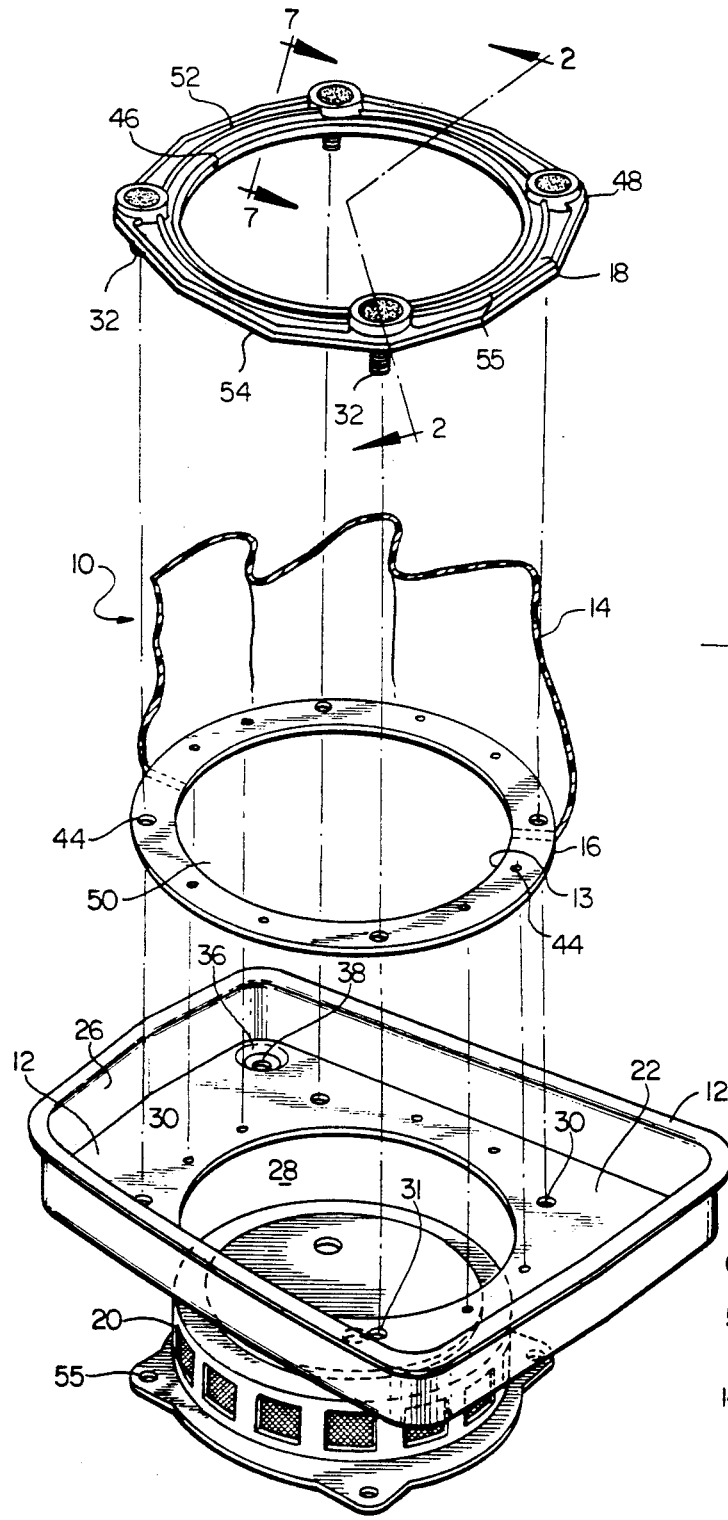
FIG. 1 is an exploded view of the air bag mounting system, showing the particular construction of the elements of the system.
Figure 2:
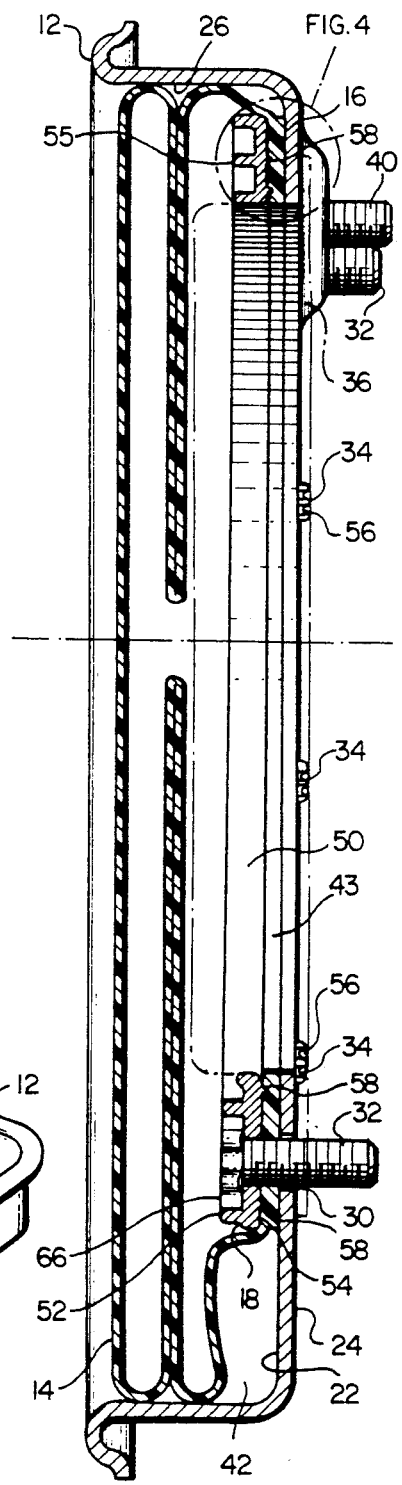
FIG. 2 is a partial sectional view, taken along line 2—2 of FIG. 1, showing the disposition of the elements when they are joined together, with the inflator removed for clarity.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. While the invention will be described with respect to employment in an air bag subassembly, it is to be understood that the invention might be successfully employed in other constructions.

Referring initially to FIG. 1, an air bag mounting system 10 constructed according to the teachings of the present invention, is shown. Basically, the air bag mounting system 10 comprises a base, or a module housing 12, and attaching means, or a retaining ring 18. An air bag 14 has a mounting flange, or a gasket 16, and when assembled with the mounting system 10, a subassembly is defined wherein the gasket 16 of the air bag 14 is sandwiched between the module housing 12, and the retaining ring 18, so that the air bag 14 is held firmly at one end, while the other end is free to expand under the influence of an inflator 20, capable of producing inflating media. The module housing 12 is composed of a malleable material, such as a soft metal, or the like.

As shown in FIG. 1, the module housing 12 has a base plate or panel 21 defining a front surface 22 and a back surface 24, and a peripheral side wall or panel 26 which forms a peripheral skirt around the base panel 21. An inflator opening 28 is formed through the base panel 21. The inflator opening 28 is of sufficient size to permit rapid increase of the inflating media generated by the inflator 20, and to transmit that medium into the air bag 14 for rapid inflation thereof. Preferably, the diameter of opening 28 is similar to the inner diameter of gasket 16 which defines the mouth of the air bag 14. The back surface 24 is designed to attach firmly to the inflator 20 in places, so as to insure a tight connection between the inflator 20 and the air bag mounting system 10.

A plurality of apertures 30, having inner wall surfaces 31, are disposed about the inflator opening 28 of the front panel 22, which communicate to the back surface 24. The apertures 30 are of sufficient size to accept both the inflator mounting studs 32 and the projecting pins 34, which are disposed about the retaining ring 18, as will be discussed herein. It will be appreciated in this regard, that where the mounting studs 32 are larger than the pins 34, the respective aperture receiving each will be sized accordingly. The size of the apertures 30 depends upon which member is to be inserted therein. A plurality of depressions or recesses 36, having central through openings or holes 38, are disposed about the front panel 22. Preferably, there is at least one recess 36 and one hole 38 associated with each corner of the module housing 12. The holes 38 accept module mounting studs 40, and the depressions 38 are deep enough so that the heads (not shown for clarity) of these module mounting studs 40 do not protrude perpendicularly upwardly from the front surface 22. The module mounting studs 40 join a completed air bag assembly to a portion of an automobile.

The side panel 26 of the module housing 12 is disposed about the base panel 21, and is substantially perpendicular to the base panel 21. The side panel 26 extends upwardly from edges of the base panel 22 to form a cavity 42. The cavity 42 is of sufficient volume to retain the air bag 14, when the air bag 14 is deflated and folded in an appropriate manner.

The air bag 14 itself is impermeable to the inflating media generated by the inflator 20, and is comprised of material sufficient to form a sizeable cushion when inflated. The air bag 14 is, of course, provided with means to permit it to deflate after an accident. The gasket portion 16 is disposed about the open end or mouth of the air bag 14. The gasket 16 has an opening 43 therein which is equal in size to the inflator opening 28 in the module housing 12. In this fashion, the inflating media generated by the inflator 20 can pass into the air bag 14, thereby inflating it. The air bag 14 is joined sufficiently to the gasket 16 so that no inflating media can pass between the air bag 14 and the gasket 16. The gasket 16 has apertures 44 disposed about it in, positions coordinated with the apertures 30 disposed on the front panel 22 of the module housing 12. This coordination allows the apertures 44 to line up precisely with the apertures 30, so that the inflator mounting studs 32 and projecting pins 34 can be inserted therein.

The retaining ring 18 is a metal casting, and has an inner diameter 46 and an outer diameter 48, with the inner diameter 46 defining an air bag opening 50 similar in size to the opening 43 in the gasket 16, and the inflator opening 28 in the module housing 12. The opening 50 allows the inflating media to pass into the air bag 14, thereby inflating it. The outer diameter 48 is small enough so that the retaining ring 18 is capable of insertion into the cavity 42 within the module housing 12.

Figure 6:
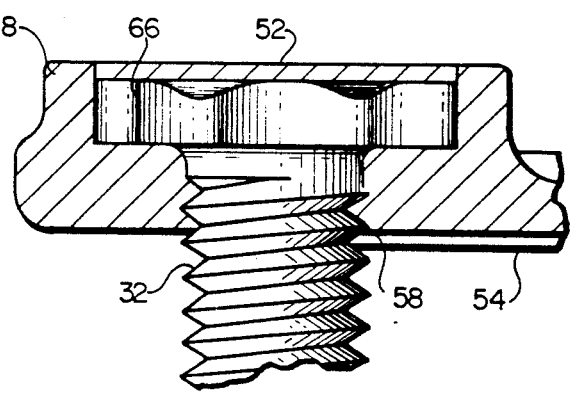
FIG. 6 is a sectional view, similar to FIG. 4, showing the disposition of the inflator mounting studs within the retaining ring.

The retaining ring 18 has a first side 52 and a second side 54. The second side 54 is designed to butt up against the gasket 16 of the air bag 14. A plurality of inflator mounting studs 32 are embedded or insert molded within the retaining ring 18. These inflator mounting studs 32 extend from the second side 54 of the retaining ring 18, but do not protrude beyond the first side 52, as shown in FIG. 6.

Figure 3:
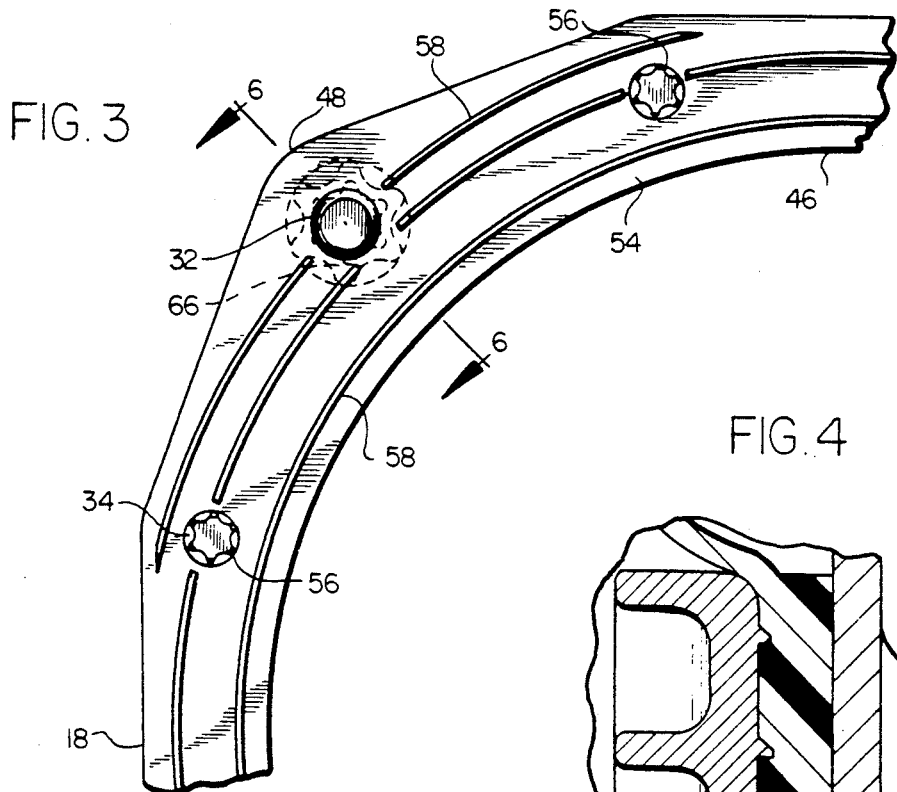
FIG. 3 is a partial sectional view, taken from the area indicated on FIG. 2, showing the construction of the retaining ring.
Figure 4:
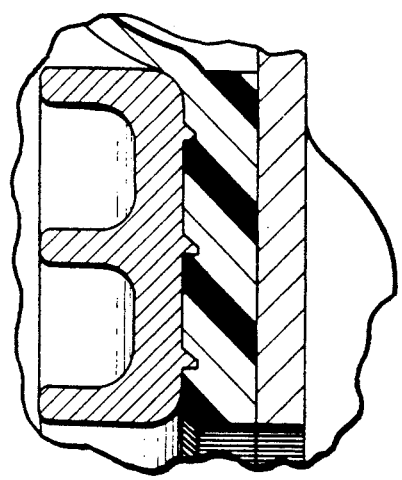
FIG. 4 is a partial sectional view of the air bag mounting system, showing the disposition of the housing, the gasket, the air bag, and the retaining ring, when the system is assembled, with the inflator removed for clarity.

In one construction, shown in FIG. 13, to be discussed more fully hereinafter, portions of the first side 52 of the retaining ring 18 extend upwardly from the first side 52. Once the inflator mounting studs 32 are properly positioned in the retaining ring 18, the portions are peened over until they are flush with the remainder of the first side 52, as shown in FIG. 13. An alternative to this configuration can be achieved by insert molding the inflator mounting studs 32 into the retaining ring 18, as illustrated in FIG. 6. This assures that the inflator mounting studs 32 are firmly held by the retaining ring 18 and will not damage the air bag 14. Additionally, the heads of the inflator mounting studs 32 can be multilobular in nature, as shown in FIG. 3. This multilobular configuration of the inflator mounting stud 32 heads serves to distribute the force load.

More specifically, with respect to the alternative embodiment of the invention depicted in FIG. 13, the multilobular heads 37 of the inflator mounting studs 32 are not insert molded into the retaining ring 18. Instead, a corresponding multilobular recess 60 is provided in the retaining ring 18. Rim portions 62 are provided on the first side 52 of the retaining ring 18 extend upwardly from the first side 52 about the recesses 60. The inflator mounting studs 32 have a multilobular head configuration 37 which mates with a corresponding configuration of the recesses 60. Once the inflator mounting studs 32 are properly positioned in the retaining ring aperture 60 so that the configurations mate, the rim portions 62 are peened over or deformed until they overlie the head of the fastener and are flush with the remainder of the first side 52, as shown in FIG. 13. The multilobular configurations reduce stress risers in the recesses 60. Thus, the retaining ring 18 is less likely to crack under the stresses applied thereto, such as those during air bag assembly and inflation.

Figure 7:
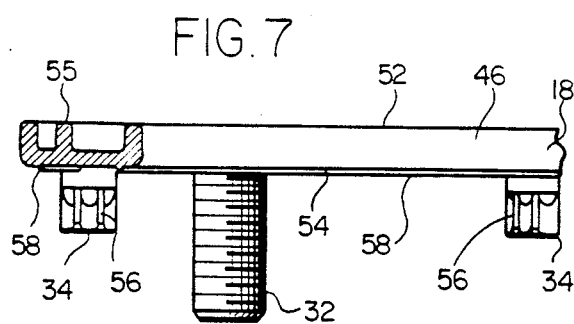
FIG. 7 is a partial sectional view, taken along line 7—7 of FIG. 1, showing the particular construction of the retaining ring; 35

The inflator mounting studs 32 are designed to be inserted through, and extend beyond the apertures 44 in the gasket 16, and the apertures 30 in the module housing 12, and into aligned mounting apertures 55 of the inflator 20. Inflator mounting studs 32 can be of various configurations, one of which is shown in FIG. 7, and another of which is shown in FIG. 10. The inflator mounting stud 32 of FIG. 7 differs from that of FIG. 10 in length and pitch of threads disposed thereon. By these studs 32, the inflator 20 is mounted to the air bag mounting system 10 using conventional nuts, not shown for clarity.

In the embodiment of FIG. 11 of the invention, portions of the retaining ring 18 extend substantially perpendicularly away from the second side 54 thereof to form inflator mounting projections 33, which take the place of the inflator mounting studs 32. The inflator mounting projections 33 do not project beyond the first side 52 of the retaining ring 18, and are substantially cylindrical in nature. The inflator mounting projections 33 perform the same functions as the inflator mounting studs 32, but the inflator mounting projections 33 are not threaded. The end portions of the inflator mounting projections 33 which extend beyond the back surface 24 of the module housing 12 are constructed so as to transform when peened over. The inflator mounting projections 33, once peened over, similar to the configuration shown in FIG. 12, will hold the inflator 20 firmly to the air bag sub-assembly without the use of conventional nuts.

Also disposed about the second side 54 are means for holding the retaining ring 18, the gasket 16, and the module housing 12 together, which means comprise the plurality of projecting pins 34. In the particular embodiment of the invention shown in FIG. 1 through 7, the projecting pins 34 are multilobular in nature, preferably having six lobes 56 disposed about lateral surfaces thereof forming lateral side surfaces. This particular structure is in accordance with the well known TORX ™ drive system configuration, disclosed in U.S. Pat. No. 3,584,667 to Rieland, assigned to the assignee of the present invention. The disclosure of the '667 patent is incorporated herein by this reference.

Figure 5:
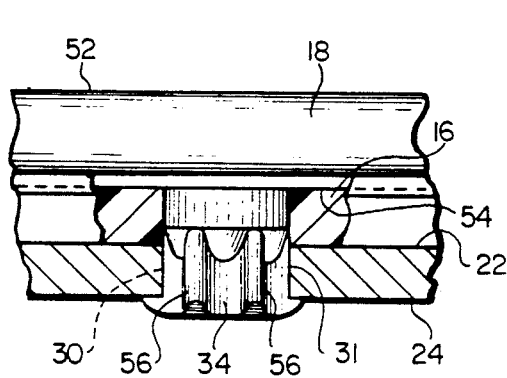
FIG. 5 is a partial sectional view, similar to FIG. 4, showing the hexlobular projecting pins peened over to strengthen the fit between the module housing and the retaining ring.

The projecting pins 34 are designed to be inserted through the apertures 44 in the gasket 16, and into the apertures 30 in the module housing 12, and are composed of a malleable material, such as a soft metal, or the like. The lobes 56 are designed to engage the inner walls 31 of the apertures 30 in the module housing 12, thereby forming a snap-type, frictioned interference fit between the retaining ring 18 and the module housing 12. Thus, when the retaining ring 18, air bag 14, and module housing 12 are initially assembled to provide a subassembly, the projecting pins 34 are disposed in their associated apertures 30 with a frictioned, interference fit. This will then serve to hold the components, viz., the module housing 12, the air bag 14, and the retaining ring 18 in initial assembly, for transport preparatory to a subsequent assembly operation. In this regard, the pins 34 can be provided with sufficient length that they can be peened over, as shown in FIG. 5, to further enhance the integrity of the assembly.

In the embodiments of the present invention depicted in FIG. 9 through 11, the projecting pins 34 are substantially cylindrical in shape, and lack the multilobular nature described above, but still may form a frictioned interference fit. Since it is anticipated, however, that the cylindrical pins of these embodiments will be peened over, as in FIG. 12, the frictioned fit may be eliminated. In these embodiments, the projecting pins 34 perform substantially the same function as described above. However, in these embodiments, portions of the projecting pins 34 which extend beyond the back surface 24 of the module housing 12 are constructed so as to transform when peened over, thereby expanding and flattening to confront the back surface 24 of the module housing 12, as shown in FIG. 12. The projecting pins 34, once peened, hold the retaining ring 18 firmly against the gasket 16 and the module housing 12, thereby assuring that the air bag sub-assembly will not come apart during mounting of the inflator 20, or the mounting of the entire air bag assembly in an automobile, for example. The peening also assures that the retaining ring 18 will not lift off of the module housing 12 due to the great forces present during air bag inflation, thereby preventing blow-by of inflating media. Additionally, the particular projecting pins 34 depicted in FIG. 11 have a draft angle which measures between 1.5 and 3 degrees, and which facilitates the frictioned interference fit.

The retaining ring 18 is relieved on the first side 52 to reduce the amount of material required in fabricating the ring 18, and also to reduce the weight of the part. This relief of the ring 18, however, must be accomplished without sacrificing the structural integrity of the part. More specifically, the retaining ring 18 must withstand the forces created during the peening of the pins 34, as well as the forces created during bag inflation and assembly of the inflator 20. In this regard, reinforcing ribs 55 are provided, and can be seen in FIGS. 3, 4, and 8 through 11. The ribs 55 serve to stiffen the ring 18 and maintain its overall structural integrity to prevent fracture thereof and also to prevent twisting of the ring 18 during bag inflation. In the preferred embodiments, the ribs 55 are positioned such that they underlie the projecting pins 34. In this regard, the ribs 55 will provide support beneath the pins 34 during the peening operation which serves to facilitate the peening process, and also to insure that the ring 18 itself does not deform during peening.

Means for securely retaining the gasket 16 so as to prevent inflating media blow-by are provided in the form of a plurality of ridges 58 disposed about the second side 54 of the retaining ring 18. The ridges 58 project from the second side 54, and form concentric circles having a centerpoint common with that of the retaining ring 18. The ridges 58 are designed to grip and to retain securely the gasket 16 once the retaining ring 18 is assembled to the housing 12 so as to prohibit, in the completed construction, blow-by of the inflating media generated by the inflator 20.

The operation of the air bag mounting system 10 during the manufacture of an air bag assembly will become more clear in the following discussion. Generally referring to FIG. 1, the elements of the air bag mounting system 10 are shown prior to assembly. First, the retaining ring 18 is inserted into the air bag 14. The retaining ring 18 so that the inflator mounting studs 32 and the projecting pins 34 are aligned with corresponding holes in the gasket portion 16 of the air bag 14. The gasket portion 16 is placed about the inflator opening 28 in the module housing 12. Particularly, the opening 43 in the gasket 16 is aligned with the inflator opening 28, and the apertures 44 in the gasket 16 are aligned with the apertures 30 in the module housing 12. The inflator mounting studs 32 and the projecting pins 34 extend through the apertures 30 in the module housing 12.

The retaining ring 18 is compressed on top of the gasket 16 a distance sufficient to allow the inflator mounting studs 32 or the inflator mounting projections 33 to project beyond the back surface 24 of the module housing 12, and to allow the ridges 58 to engage and to bite into the gasket 16 of the air bag 14. The compression of the retaining ring 18 also allows the projecting pins 34 to become frictionally engaged in the apertures 30 in the module housing 12, if this feature is to be employed.

The projecting pins 34 frictionally engage the apertures 30 to form a frictioned interference fit between the module housing 12 and the retaining ring 18, thereby holding the elements of the air bag subassembly, thus formed, in place. In one of the embodiments, as shown in FIG. 5, each of the lobes 56 engage the inner wall 31 of the apertures 30 in the module housing 12. Thus, each projection 34 has six distinct sites of frictioned engagement with the inner wall 31 of an aperture 30. Also, the lobes 56 result in an effective outer diameter of the projecting pins 34 greater than the diameter of the holes 30, thereby the pins 34 engage or "snap into" the holes 30. The other constructions of the projecting pins 34 also form a frictioned engagement with the inner wall 31 of the aperture 30. This frictioned engagement supplies sufficient holding force so as to maintain the disposition of the elements of the air bag subassembly during preliminary assembly operations. This frictioned engagement is aided by deformation, due to the malleability of the apertures 30, and the projecting pins 34. Then, as shown in FIG. 5 and FIG. 12, the projecting pins 34 may be peened over to increase the strength of the clamped fit between the retaining ring 18 and the module housing 12. With the embodiments of the present invention depicted in FIG. 8 through 12, the construction of the air bag mounting system 10 is substantially similar to that discussed above. In these embodiments, however, it will be recalled that the pins 34 are cylindrical, and are peened over following disposition in the associated apertures 30. With the cylindrical pins 34 a frictioned fit can be used, but in most instances the peening of the ends of the cylindrical pins 34 will take place immediately upon assembly of the retaining ring 18.

It must be emphasized that the air bag mounting system 10 of the present invention is intended only to hold the elements of the air bag subassembly together during further assembly with the inflator, prior to installation of the completed assembly into a vehicle. The air bag mounting system 10 of the present invention presents many advantages. The snap-type interference fit between the retaining ring 18 and the module housing 12 comprises a simple, yet effective means for joining the initial elements of an air bag subassembly together prior to assembly with the inflator and installation which is less expensive, and less time consuming than those means currently available. Further, there is a smaller chance of damaging the air bag 14 by using the above-disclosed means, than by using other, currently available, means, such as independent riveting or staking. Also, the air bag mounting system 10 provides means for assisting in the prevention of inflating media blow-by during actuation of the air bag assembly, thereby increasing the life saving benefits of an air bag. By peening over the inflator mounting projections 33 and the projecting pins 34, the strength of the fit is substantially increased, thereby assuring proper operation of the air bag 14 in an automotive vehicle.

While preferred embodiments of the present invention are shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. An air bag mounting system for assembling an air bag having a mounting flange with an air bag inflator and for thereafter assembling the assembled air bag and inflator with a preselected surface of an automotive vehicle, the air bag mounting system comprising: a module housing, and a retaining ring; the module housing having a plurality of through apertures therein; the apertures defining inner walls surfaces; the air bag mounting flange being disposed between the module housing and the retaining ring; the retaining ring having a plurality of integral projecting pins located for insertion into the apertures; and the projecting pins having lateral side surfaces formed to engage the aperture inner wall surfaces in a frictioned interference fit capable of holding the module housing, the air bag, and the retaining ring together in a pre-assembled condition, ready for further assembly with the inflator, wherein the inner walls of the apertures, and the projecting pins are composed of a malleable material.

2. An air bag mounting system as defined in claim 1 wherein the module housing has a cavity capable of accepting an air bag in a deflated condition.

3. An air bag mounting system for assembling an air bag having a mounting flange with an air bag inflator and for thereafter assembling the assembled air bag and inflator with a preselected surface of an automotive vehicle, the air bag mounting system comprising: a module housing, and a retaining ring; the module housing having a plurality of through apertures therein; the apertures defining inner walls surfaces; the air bag mounting flange being disposed between the module housing and the retaining ring; the retaining ring having a plurality of integral projecting pins located for insertion into the apertures; and the projecting pins having lateral side surfaces formed to engage the aperture inner wall surfaces in a frictioned interference fit capable of holding the module housing, the air bag, and the retaining ring together in a pre-assembled condition, ready for further assembly with the inflator, retaining means for securely retaining the air bag mounting flange, wherein the retaining means comprises a plurality of raised ridges disposed about one of the module housing, and the retaining ring, and located for engagement with the air bag mounting flange.

4. An air bag mounting system as defined in claim 3 wherein the air bag mounting flange has a gasket, and the ridges are compressed into the gasket so as to increase the effectiveness of the means for preventing blow-by of inflating media, and minimize movement of the gasket during inflation of the air bag.

5. An air bag mounting system for assembling an air bag having a mounting flange with an air bag inflator and for thereafter assembling the assembled air bag and inflator with a preselected surface of an automotive vehicle, the air bag mounting system comprising: a module housing, and a retaining ring; the module housing having a plurality of through apertures therein; the apertures defining inner wall surfaces; the air bag mounting flange being disposed between the module housing and the retaining ring; the retaining ring having a plurality of integral projecting pins located for insertion into the apertures; and the projecting pins having lateral side surfaces formed to engage the aperture inner wall surfaces in a frictioned interference fit capable of holding the module housing, the air bag, and the retaining ring together in a pre-assembled condition, ready for further assembly with the inflator, wherein the lateral side surfaces of the projecting pins are multilobular in configuration.

6. An air bag mounting system for assembling an air bag having a mounting flange with an air bag inflator and for thereafter assembling the assembled air bag and inflator with a preselected surface of an automotive vehicle, the air bag mounting system comprising: a module housing, and a retaining ring; the module housing having a plurality of through apertures therein; the apertures defining inner wall surfaces; the air bag mounting flange being disposed between the module housing and the retaining ring; the retaining ring having a plurality of integral projecting pins located for insertion into the apertures; and the projecting pins having lateral side surfaces formed to engage the aperture inner wall surfaces in a frictioned interference fit capable of holding the module housing, the air bag, and the retaining ring together in a pre-assemble condition, ready for further assembly with the inflator, wherein the projecting pins are flattened to confront and engage the module housing once the projecting pins have been inserted into the through apertures.

7. An air bag mounting system for assembling an air bag having a mounting flange with an air bag inflator and for thereafter assembling the assembled air bag and inflator with a preselected surface of an automotive vehicle, the air bag mounting system comprising: a base, and attaching means for engaging the air bag with the base; and means for providing a fit between the attaching means and the base for retaining the air bag mounting flange therebetween in a pre-assembled condition, ready for further assembly with the inflator, wherein the attaching means is insertable into the base, and is deformed so that portions of the attaching means confront and engage a side of the base opposite to the attaching means.

8. An air bag mounting system as defined in claim 7 wherein the attaching means comprises a retaining ring capable of engaging the air bag with the base.

9. An air bag mounting system as defined in claim 7 wherein the base has a cavity capable of accepting an air bag.

10. An air bag mounting system as defined in claim 7 wherein threaded inflator mounting studs are disposed about the retaining ring; the inflator mounting studs being insertable into the inflator so as to mount the inflator to the base, and to secure the mounting flange during inflation of the air bag.

11. An air bag mounting system as defined in claim 10 wherein threaded module mounting studs are disposed about the base; those mounting studs being insertable into a preselected surface of an automotive vehicle so as to mount the air bag on the vehicle.

12. An air bag mounting system as defined in claim 7 wherein inflator mounting projections are disposed about the retaining ring; the inflator mounting studs being insertable into the inflator so as to mount the inflator to the base, and to secure the mounting flange during inflation of the air bag; and portions of the inflator mounting projections which extend beyond the inflator being deformed so as to confront and engage the inflator on a side thereof opposite to the mounting flange.

13. An air bag mounting system as defined in claim 7 wherein the retaining ring has inflator mounting studs, capable of mounting the inflator to the base, held within multilobular recesses with the inflator mounting studs having heads with multilobular configurations substantially similar to a corresponding configuration of the multilobular recesses so as to mesh therewith.

14. An air bag mounting system for assembling an air bag having a mounting flange with an air bag inflator and for thereafter assembling the assembled air bag and inflator with a preselected surface of an automotive vehicle, the air bag mounting system comprising: a base, and attaching means for engaging the air bag with the base; and means for providing a fit between the attaching means and the base for retaining the air bag mounting flange therebetween in a pre-assembled condition, ready for further assembly with the inflator, wherein the attaching means forms a frictioned fit with the base, and wherein the means for providing a frictioned fit between the attaching means and the base comprises a plurality of complimentary projecting pins formed on one of the base and the attaching means, and apertures formed on the other of the base and attaching means; and the projecting pins being insertable into the apertures.

15. An air bag mounting system as defined in claim 14 wherein portions of the complimentary projecting pins which extend beyond the base after insertion into the apertures are deformed so as to confront and engage a side of the base opposite to the attaching means.

16. An air bag mounting system as defined in claim 14 wherein the projecting pins have a plurality of lobes, and the apertures have inner walls; and the lobes engage the inner walls so as to provide the frictioned interference fit.

17. An air bag mounting system as defined in claim 16 wherein the lobes, and the inner walls are composed of malleable material.

18. An air bag mounting system for assembling an air bag having a mounting flange with an air bag inflator and for thereafter assembling the assembled air bag and inflator with a preselected surface of an automotive vehicle, the air bag mounting system comprising: a base, and attaching means for engaging the air bag with the base; and means for providing a fit between the attaching means and the base for retaining the air bag mounting flange therebetween in a pre-assembled condition, ready for further assembly with the inflator, and means for preventing blow-by of inflating media, comprising ridges capable of compressing the air bag between the base and the attaching means at certain locations.

19. A joint structure for a structural component and a multilobular fastener member, the joint structure comprising: a fastener member having an elongated shank and a multilobular head portion; the structural component having a recess formed therein with walls of the recess being of complementary shape to the multilobular head; a rim portion provided about the aperture and projecting from the structural component; and the rim portion being deformed radially inward of the aperture to overlie the head of the fastener and thereby to join the fastener to the structural component.

* * * * *